United States Patent
Bachrach

(10) Patent No.: US 8,792,302 B2
(45) Date of Patent: Jul. 29, 2014

(54) ESTIMATING ANISOTROPIC PARAMETERS

(75) Inventor: Ran Bachrach, Houston, TX (US)

(73) Assignee: WesternGeco L.L.C., Houston, TX (US)

(*) Notice: Subject to any disclaimer, the term of this patent is extended or adjusted under 35 U.S.C. 154(b) by 552 days.

(21) Appl. No.: 13/098,589

(22) Filed: May 2, 2011

(65) Prior Publication Data

US 2011/0292766 A1    Dec. 1, 2011

Related U.S. Application Data

(60) Provisional application No. 61/348,591, filed on May 26, 2010.

(51) Int. Cl.
*G01V 1/00* (2006.01)
*G01V 1/28* (2006.01)

(52) U.S. Cl.
CPC .......... *G01V 1/282* (2013.01); *G01V 2210/665* (2013.01)
USPC ...................... 367/73; 367/14; 703/5; 703/10

(58) Field of Classification Search
CPC ......... G01V 1/50; G01V 99/00; G01V 1/282; G01V 3/083; G01V 3/38; G01V 3/12; G01V 11/00
USPC ........... 367/38, 53, 73; 702/7, 11; 703/2, 5, 7, 703/10
See application file for complete search history.

(56) References Cited

U.S. PATENT DOCUMENTS

| | | | |
|---|---|---|---|
| 6,044,328 A * | 3/2000 | Murphy et al. ............... | 702/11 |
| 7,286,939 B2 | 10/2007 | Bachrach et al. | |
| 7,526,413 B2 * | 4/2009 | Dahlberg ....................... | 703/2 |
| 8,184,502 B2 * | 5/2012 | Xu et al. ....................... | 367/38 |
| 8,185,313 B2 * | 5/2012 | Houck .......................... | 702/7 |
| 2008/0086287 A1 * | 4/2008 | Xu et al. ....................... | 703/2 |
| 2009/0184958 A1 | 7/2009 | Osypov et al. | |
| 2009/0257308 A1 * | 10/2009 | Bevc et al. ................... | 367/53 |

* cited by examiner

*Primary Examiner* — Daniel L Murphy

(57) ABSTRACT

A method for processing seismic data. The method includes performing a plurality of stochastic simulations for one or more rock model parameters to generate one or more anisotropic parameters for a subsurface area of the earth. The method then derives one or more joint multi-dimensional probability density functions for the anisotropic parameters. Using the joint multi-dimensional probability density functions and measured well log data, the method computes one or more posterior probability density functions. The method then includes deriving one or more anisotropic profiles from the posterior probability density functions and generating a seismic image from the anisotropic profiles.

20 Claims, 3 Drawing Sheets

ESTIMATING ANISOTROPIC PARAMETERS

CROSS-REFERENCE TO RELATED APPLICATIONS

This application claims benefit of U.S. provisional patent application Ser. No. 61/348,591, filed May 26, 2010, which is incorporated herein by reference.

BACKGROUND OF THE INVENTION

1. Field of the Invention

Implementations of various technologies described herein generally relate to seismic data processing. In particular, various technologies described herein relate to a method for estimating properties of a subsurface area of the earth, such as anisotropic parameters.

2. Description of the Related Art

For many years, seismic exploration for oil and gas has been conducted by use of a source of seismic energy and the reception of the energy generated by the source by an array of seismic detectors. On land, the source of seismic energy may be a high explosive charge or another energy source having the capacity to deliver a series of impacts or mechanical vibrations to the earth's surface. Acoustic waves generated by these sources travel downwardly into geological formations in the earth's subsurface and are reflected back from strata boundaries and reach the surface of the earth at varying intervals of time, depending on the distance traveled and the characteristics of the subsurface traversed. These returning waves are detected by the sensors, which function to transform such acoustic waves into electrical signals that represent features of geological formations. The detected signals are recorded for processing using digital computers. The processing then generates seismic data which can be analyzed to determine the presence or absence of probable locations of hydrocarbon deposits.

Typically, an array of sensors is laid out along a line to form a series of detection locations. More recently, seismic surveys are conducted with sensors and sources laid out in generally rectangular grids covering an area of interest, rather than along a single line, to enable construction of three dimensional views of reflector positions over wide areas. Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional seismic data.

When determining the presence or absence of probable locations of hydrocarbon deposits, estimates of anisotropic parameters or stresses on the earth subsurface may be very useful. The importance of anisotropic stress estimates increases when anisotropic stresses are not equal to each other and when some preferred directions, e.g., directions of maximum and minimum anisotropic stresses, exist in geological media.

Examples of applications requiring good knowledge of existing anisotropic stresses include planning of drilling operation and mine construction. In those situations, poor estimates of anisotropic stresses may lead to additional costs and safety problems related to geological hazards and instability of a borehole or a mine. Furthermore, the development of many existing oil fields and orientation of fractures are typically controlled by direction of maximum horizontal anisotropic stresses. Therefore, anisotropic stress characterization performed prior to production may reduce risk in reservoir management decisions, particularly for production in areas having salt bodies.

SUMMARY OF THE INVENTION

Described herein are implementations of various technologies of a method for estimating anisotropic parameters.

In one implementation, a method for estimating anisotropic parameters may include performing a plurality of stochastic simulations for one or more rock model parameters to generate one or more anisotropic parameters for a subsurface area of the earth. The method may then derive one or more joint multi-dimensional probability density functions for the anisotropic parameters. After deriving the joint multi-dimensional probability density functions, the method may compute one or more posterior probability density functions using the joint multi-dimensional probability density functions and measured well log data. The method may then include deriving one or more anisotropic profiles from the posterior probability density functions and generating a seismic image from the anisotropic profiles.

In another implementation, the method for estimating anisotropic parameters may include defining a rock model having one or more rock model parameters, estimating one or more rock model parameter ranges for the rock model parameters and estimating one or more prior probabilities for the rock model parameter ranges. The method may then perform a plurality of stochastic simulations for each rock model parameter range to generate one or more anisotropic parameters for a subsurface area of the earth. After generating the anisotropic parameters for the subsurface area of the earth, the method may derive one or more joint multi-dimensional probability density functions for the anisotropic parameters and compute one or more posterior probability density functions from measured well log data and the joint multi-dimensional probability density functions. The method may then include deriving one or more anisotropic profiles from the posterior probability density functions and generating a seismic image from the anisotropic profiles.

Also, described herein are implementations of various technologies of a method for conditioning tomography using estimated anisotropic parameters. In one implementation, the method for conditioning tomography may include performing a plurality of stochastic simulations for one or more rock model parameters to generate one or more anisotropic parameters for a subsurface area of the earth. After generating the anisotropic parameters for the subsurface area of the earth, the method may derive one or more joint multi-dimensional probability density functions for the anisotropic parameters and derive one or more joint multi-dimensional probability density functions for an elastic anisotropy of a rock matrix from the joint multi-dimensional probability density functions for anisotropic parameters. After deriving the joint multi-dimensional probability density functions for the elastic anisotropy of a rock matrix, the method may include conditioning a tomography operator based on the joint multi-dimensional probability density functions for the elastic anisotropy of the rock matrix. The method may then perform tomography using the conditioned tomography operator to generate a tomographic image.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
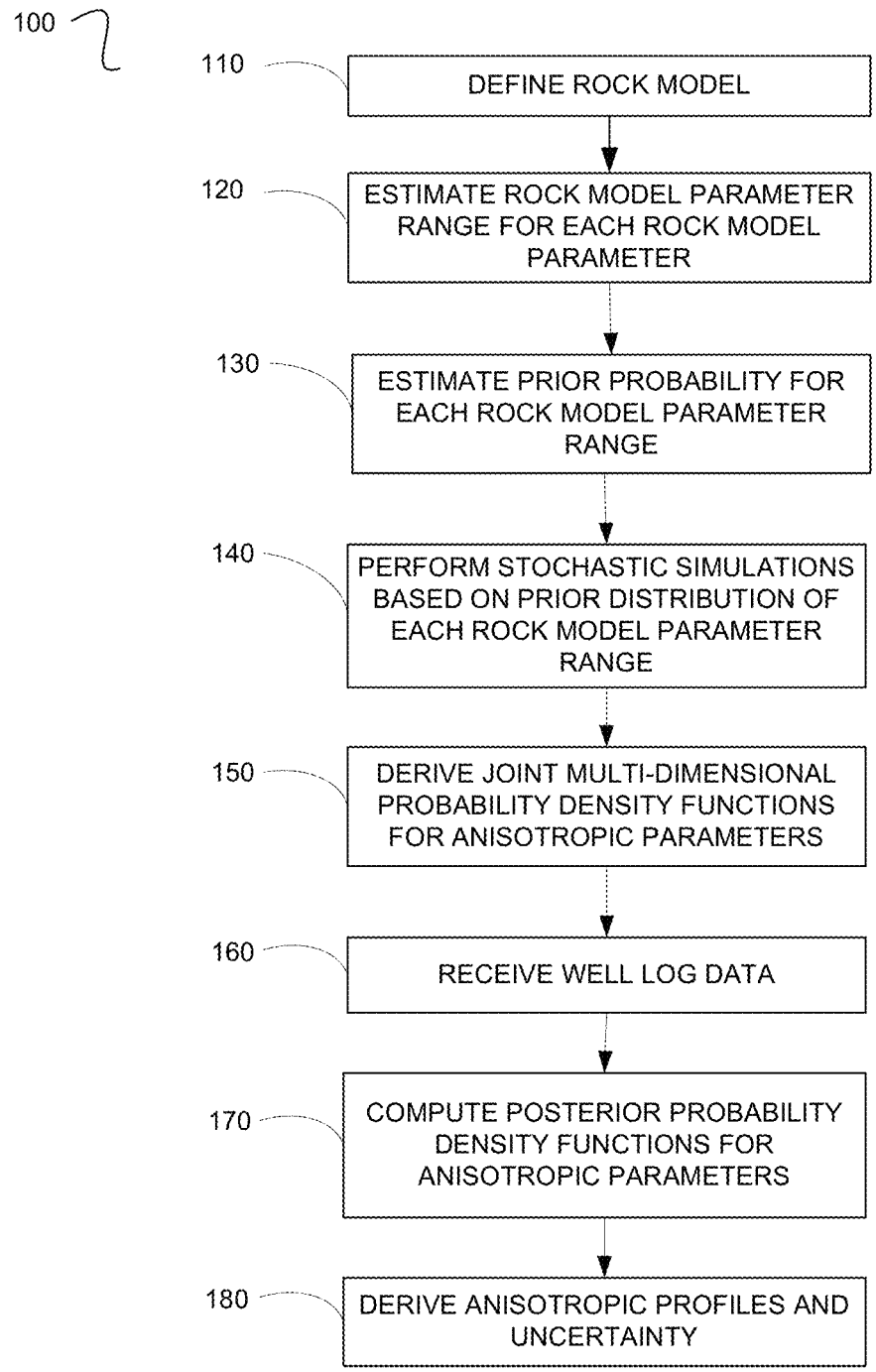
FIG. 1 illustrates a flow diagram of a method for estimating anisotropic parameters in a subsurface area of the earth in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

This paragraph and the following paragraphs provide a brief description of one or more implementations of various technologies and techniques directed at estimating anisotropic parameters in a subsurface area of the earth and conditioning tomography using estimated anisotropic parameters. In one implementation, the method for estimating anisotropic parameters in a subsurface area of the earth and conditioning tomography using estimated anisotropic parameters may be performed by a computer application. As such, the computer application may first define a rock model using certain input rock model parameters, such as porosity, velocity, resistivity, compaction and the like.

After defining the rock model, the computer application may estimate a rock model parameter range for each rock model parameter. The computer application may also estimate a prior probability for each rock model parameter value in each rock parameter range based on a geological understanding of the subsurface area of the earth (e.g., basin). Using the prior probability for each rock model parameter, the computer application may perform stochastic simulations to generate elasticity and resistivity anisotropic parameters of the subsurface area of the earth.

The computer application may then derive joint multi-dimensional probability density functions for the elasticity and resistivity anisotropic parameters from the stochastic simulations. The joint multi-dimensional probability density functions describe the relative likelihood for the elasticity and resistivity anisotropic parameters to occur at a given point in the observation space (i.e., subsurface area of the earth).

The computer application may then compute posterior (conditional) probability density functions for elasticity and resistivity anisotropic parameters in the earth based on well log data and the joint multi-dimensional probability density functions. In one implementation, the well log data may have been acquired from borehole measurements or the like. Using the posterior probability density functions, the computer application may then derive elasticity and resistivity anisotropic parameters and uncertainty (i.e., range of errors) for the subsurface area of the earth.

In another implementation, the computer application may condition tomography using the anisotropic parameters as determined above. As such, after estimating a prior probability for each rock model parameter value in each rock parameter range as described above, the computer application may perform stochastic simulations to generate elasticity anisotropic parameters by sampling the prior probability for each rock model parameter. The computer application may then derive joint multi-dimensional probability density functions for the elasticity anisotropic parameters from the stochastic simulations. Based on the joint multi-dimensional probability density functions for the elasticity anisotropic parameters, the computer application may derive joint probability density functions for anisotropic parameters, $\epsilon$, $\delta$, and vertical velocity.

The computer application may then provide the joint probability density functions as a prior to condition a tomography operator such that tomography may be performed using the conditioned tomography operator.

Various techniques for estimating anisotropic parameters in a subsurface area of the earth and conditioning tomography using estimated anisotropic parameters will now be described in more detail with reference to FIGS. 1-3 in the following paragraphs.

FIG. 1 illustrates a flow diagram of a method for estimating anisotropic parameters in a subsurface area of the earth in accordance with implementations of various techniques described herein. In one implementation, method 100 may be performed by a computer application. It should be understood that while method 100 indicates a particular order of execution of the operations, in some implementations, certain portions of the operations might be executed in a different order.

At step 110, the computer application defines a rock model. The rock model may be defined by certain input rock model parameters such as porosity, velocity, resistivity, compaction (i.e., theoretical observation of general reduction of porosity as a function of depth), percent quartz, critical porosity, compaction parameters and the like. In one implementation, the rock model is used to predict certain output rock model parameters, such as anisotropy parameters. Some of the output rock model parameters include elastic and electrical (i.e., conductivity/resistivity) anisotropy properties of the subsurface area of the earth.

In one implementation, the rock model is a shale compaction rock model capable of predicting both elastic and electrical anisotropy using a conceptual compaction process and input rock model parameters. Shale compaction rock models may capture the geological process of porosity reduction and geochemical compaction in terms of microstructural parameters associated with particle alignment and pore-shape deformation. In this manner, the electrical resistivity and elastic anisotropy may be predicted by the shale compaction rock model using the same microstructural parameters, thereby enabling the computer application to look at resistivity and elastic anisotropy jointly and explore the use of electrical resistivity anisotropy measurements to constrain elastic anisotropy, and vice versa. Additional information related to shale compaction models can be found in *Elastic and Resistivity Anisotropy of Compacting Shale: Joint Effective Medium Modeling and Field Observations* by Ran Bachrach. (Bachrach R., 2010, Elastic and resistivity anisotropy of compacting shale: Joint effective medium modeling and field observations, SEG 80th Annual meeting Extended abstract, Denver, Colo.), which is incorporated herein by reference.

A comparison of the output rock model parameters (i.e., rock model predictions) to field observations may illustrate how the shale compaction rock model is generally in agreement with observed anisotropy values. As such, the shale compaction rock model may be used to improve seismic anisotropy estimates by constraining the rock model to observed electrical anisotropy in well logs or perhaps in the future with surface-based electro-magnetic (EM) inversion.

At step 120, the computer application estimates a rock model parameter range for each rock model parameter. In one implementation, the rock model parameter range for each rock model parameter is based on a physical range of the corresponding rock model parameter.

At step 130, the computer application estimates a prior probability for each rock model parameter range. The prior probability for each rock model parameter range is based on a geological understanding of the basin. The prior distribution of a rock parameter range may include how a rock model parameter is distributed in a probability space. For example, the prior distribution of quartz may include a probability that the percentage of quartz is distributed uniformly between 0 and 0.6. Although the prior probability has been described as being estimated for each rock model parameter range, it should be noted that in some implementations the prior probability may be estimated for each rock model parameter. At step 140, the computer application performs stochastic simulations to generate elasticity and resistivity anisotropic parameters by sampling the prior probability of each rock model parameter range determined at step 130. An example of this step is provided in *Applications of Deterministic and Stochastic Rock Physics Modeling to Anisotropic Velocity Model Building* by Ran Bachrach. (Bachrach R., 2010, Applications of Deterministic and Stochastic Rock Physics Modeling to Anisotropic Velocity Model Building, SEG 80th Annual meeting Extended abstract, Denver, Colo.), which is incorporated herein by reference.

At step 150, the computer application derives joint multi-dimensional probability density functions for the elasticity and resistivity anisotropic parameters generated by the stochastic simulations. In one implementation, the joint multi-dimensional probability density functions for anisotropic parameters are defined as:

$$P(\epsilon,\delta,R_v,R_h,\phi,k,m,n)$$

where $\epsilon$ and $\delta$ are parameters defining the rock elastic anisotropy, $R_v$ and $R_h$ are the horizontal and vertical electrical resistivity of the rock, $\phi$ is the critical porosity, and k, m, n are parameters describing the deformation of pore space and alignment of particles.

At step 160, the computer application receives well log data. The well log data may include information related to local resistivity and anisotropy values, density, porosity, gamma ray, seismic pressure wave and/or shear velocity obtained from borehole measurements. In one implementation, the local resistivity and anisotropy values are obtained from an anisotropic logging tool such as RT Scanner by Schlumberger.

At step 170, the computer application computes posterior or conditional probability density functions for elasticity and resistivity anisotropic parameters in the subsurface of the earth based on the received well log data (step 150) and the joint multi-dimensional probability density functions for the elasticity and resistivity anisotropic parameters (step 140). The posterior probability density functions for elasticity and resistivity anisotropic parameters are defined as:

$$P(\epsilon,\delta|R_v,R_h)$$

where the probability density functions of $\epsilon$ and $\delta$ are based on the vertical ($R_v$) and horizontal ($R_h$) electrical resistivity of the rock as indicated in the received well log data. Although the posterior probability density functions for elasticity and resistivity anisotropic parameters in the subsurface of the earth have been described above as being based on the vertical and horizontal electrical resistivity of the rock, it should be noted that the posterior probability density functions for elasticity and resistivity anisotropic parameters may also be based on various other data found in the well log data such as density, porosity, gamma ray, seismic pressure waves, shear velocity and the like.

At step 180, the computer application derives anisotropic elasticity and resistivity anisotropic profiles and uncertainty ranges (i.e., ranges of errors) from the posterior probability density functions computed at step 170. In one implementation, the elasticity and resistivity anisotropic profiles and uncertainty ranges are used to generate a seismic image for locating hydrocarbons in the subsurface of the earth.

Figure 2:
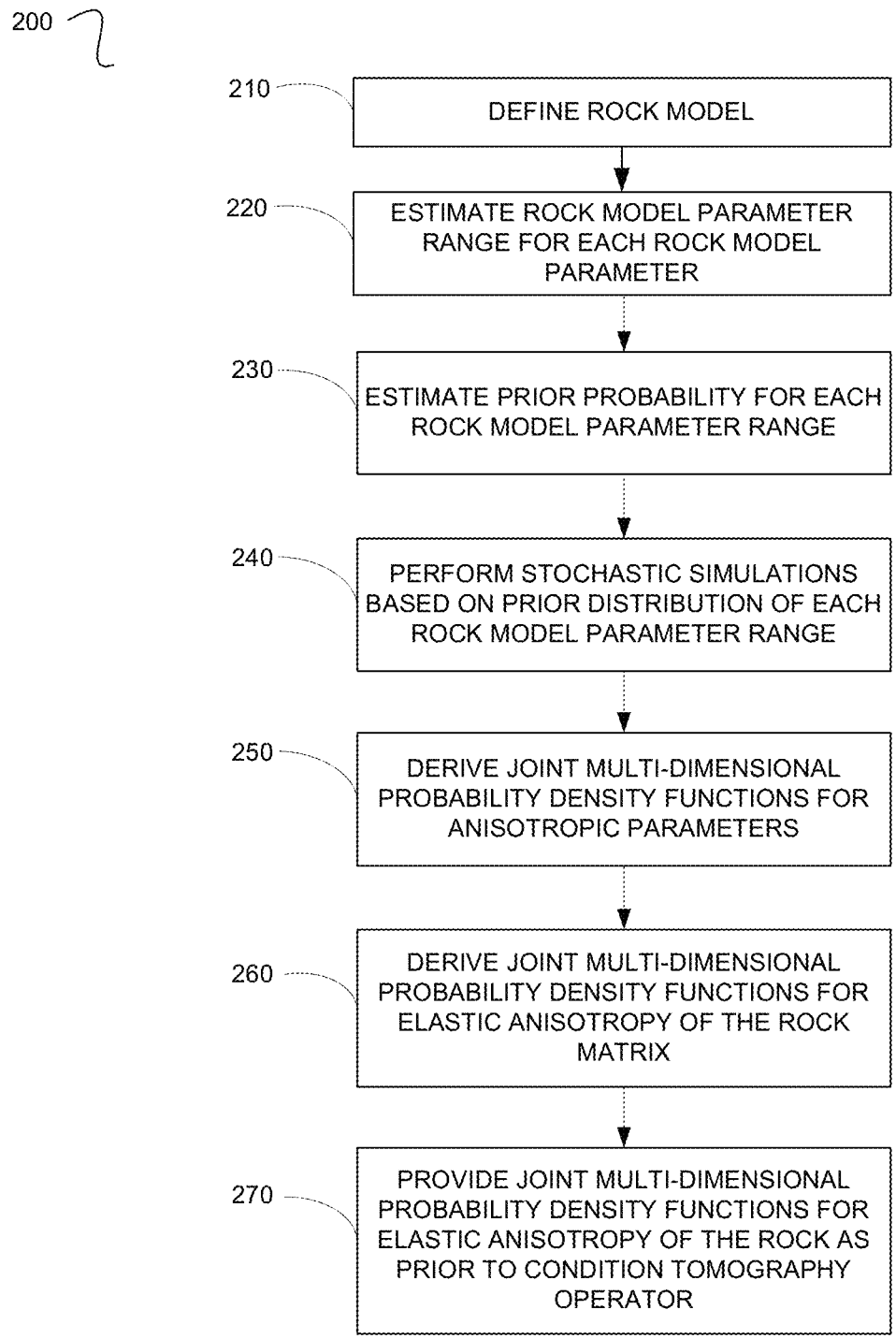
FIG. 2 illustrates a flow diagram of a method for conditioning tomography using estimated anisotropic parameters in accordance with implementations of various techniques described herein.
Figure 3:
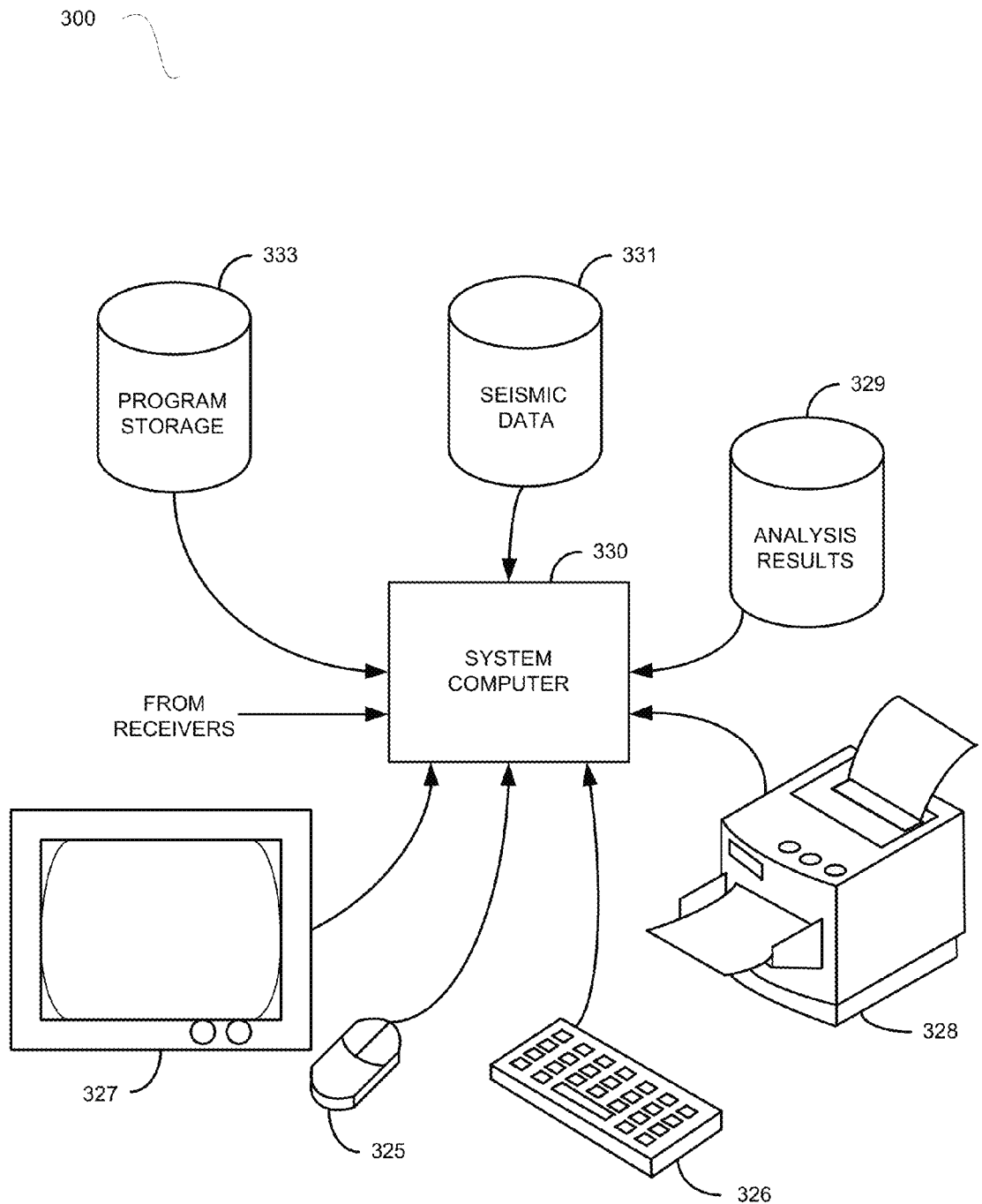
FIG. 3 illustrates a computer network into which implementations of various technologies described herein may be implemented.

FIG. 2 illustrates a flow diagram of a method for conditioning tomography using estimated anisotropic parameters in accordance with implementations of various techniques described herein. In one implementation, method 200 may be performed by a computer application. It should be understood that while method 200 indicates a particular order of execution of the operations, in some implementations, certain portions of the operations might be executed in a different order.

Steps 210-250 of method 200 correspond to steps 110-150 of method 100. At step 260, the computer application derives joint probability density functions for elastic anisotropy of the rock matrix from the joint multi-dimensional probability density functions for anisotropic parameters determined at step 250. The elastic anisotropy of the rock matrix may include anisotropic parameter $\epsilon$ and $\delta$ and vertical velocity (i.e, $V_v$). The joint probability density functions for the elastic anisotropy of the rock matrix are defined as:

$$P(\epsilon,\delta,V_v)$$

In one implementation, the joint probability density functions for the elastic anisotropy of the rock matrix are determined by summing over all possible rock model parameters, observing the interrelationship between $\epsilon$, $\delta$, and $V_v$ and deriving the marginal probability density functions for $\epsilon$, $\delta$, and $V_v$. The marginal probability density functions for $\epsilon$, $\delta$, and $V_v$ are defined as:

At step 270, the computer application provides the joint probability density functions for the elastic anisotropy of the rock matrix as a prior to condition a tomography operator and/or to sample prior distribution for uncertainty work flow. In one implementation, the conditioned tomography operator is then be used to generate a tomographic image. In another implementation, the joint probability density functions for the elastic anisotropy of the rock matrix are supplied as prior posterior covariances functions or range limits for conditioning the tomography operator as described in commonly assigned U.S. Patent Application Publication No. 2009-0184958 A1 which is incorporated herein by reference. Additional details for steps 260-270 are provided in FIG. 7 of *Applications of Deterministic and Stochastic Rock Physics Modeling to Anisotropic Velocity Model Building* by Ran Bachrach. (Bachrach R., 2010, Applications of Deterministic and Stochastic Rock Physics Modeling to Anisotropic Velocity Model Building, SEG 80th Annual meeting Extended abstract, Denver, Colo.). FIG. 3 illustrates a computer network 300, into which implementations of various technologies described herein may be implemented. In one implementation, various techniques for estimating anisotropic parameters and conditioning tomography using estimated anisotropic parameters as described in FIGS. 1-2 may be performed using the computer network 300. The computer network 300 may includes a system computer 330, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, mini-computers, mainframe computers, high-performance clusters of computers, co-processing-based systems (GPUs, FPGAs) and the like. In one implementation, the computer application described in the methods of FIGS. 1-2 may be stored on the system computer 330.

The system computer 330 is in communication with disk storage devices 329, 331, and 333, which may be external hard disk storage devices. It is contemplated that disk storage devices 329, 331, and 333 are conventional hard disk drives, and as such, will be implemented by way of a local area network or by remote access. Of course, while disk storage devices 329, 331, and 333 are illustrated as separate devices, a single disk storage device may be used to store any and all of the program instructions, measurement data, and results as desired.

In one implementation, seismic data from hydrophones are stored in disk storage device 331. The system computer 330 may retrieve the appropriate data from the disk storage device 331 to process seismic data according to program instructions according to program instructions that correspond to the implementations of various technologies described herein. The program instructions may be written in a computer programming language, such as C++, Java and the like. The program instructions may be stored in a computer-readable memory, such as program disk storage device 333. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 300.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 330 may present output primarily onto graphics display 327. The system computer 330 may store the results of the methods described above on disk storage 329, for later use and further analysis. The keyboard 326, the pointing device (e.g., a mouse, trackball, or the like) 325 and the printer 328 may be provided with the system computer 330 to enable interactive operation.

The system computer 330 may be located at a data center remote from the survey region. The system computer 330 is in communication with hydrophones (either directly or via a recording unit, not shown), to receive signals indicative of the reflected seismic energy. After conventional formatting and other initial processing, these signals may be stored by the system computer 330 as digital data in the disk storage 331 for subsequent retrieval and processing in the manner described above. In one implementation, these signals and data may be sent to the system computer 330 directly from sensors, such as geophones, hydrophones and the like. When receiving data directly from the sensors, the system computer 330 may be described as part of an in-field data processing system. In another implementation, the system computer 330 may process seismic data already stored in the disk storage 331. When processing data stored in the disk storage 331, the system computer 330 may be described as part of a remote data processing center, separate from data acquisition. The system computer 330 may be configured to process data as part of the in-field data processing system, the remote data processing system or a combination thereof. While FIG. 3 illustrates the disk storage 331 as directly connected to the system computer 330, it is also contemplated that the disk storage device 331 may be accessible through a local area network or by remote access. Furthermore, while disk storage devices 329, 331 are illustrated as separate devices for storing input seismic data and analysis results, the disk storage devices 329, 331 may be implemented within a single disk drive (either together with or separately from program disk storage device 333), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for processing seismic data, comprising:
performing a plurality of stochastic simulations for one or more rock model parameters to generate one or more anisotropic parameters for a subsurface area of the earth;
deriving one or more joint multi-dimensional probability density functions for the anisotropic parameters generated by the stochastic simulations;
computing one or more posterior probability density functions from measured well log data and the joint multi-dimensional probability density functions;
deriving one or more anisotropic profiles from the posterior probability density functions;
generating a seismic image from the anisotropic profiles; and
displaying the seismic image.

2. The method of claim 1, further comprising defining a rock model having the one or more rock model parameters.

3. The method of claim 2, wherein the rock model is a shale compaction rock model.

4. The method of claim 1, wherein the rock model parameters comprise percent of quartz, critical porosity or compaction parameters in a subsurface area of the earth.

5. The method of claim 1, further comprising estimating one or more rock model parameter ranges for the one or more rock model parameters.

6. The method of claim 5, wherein the rock model parameter ranges are estimated based on a geological understanding of a basin.

7. The method of claim 5, wherein the plurality of stochastic simulations are performed by sampling a prior probability for each rock model parameter range.

8. The method of claim 1, wherein the plurality of stochastic simulations are performed by sampling a prior probability for each rock model parameter.

9. The method of claim 8, wherein the prior probability is based on a physical range for each rock model parameter.

10. The method of claim 1, wherein the anisotropic parameters are elasticity and resistivity anisotropic parameters.

11. The method of claim 1, wherein the measured well log data comprise one or more local resistivity and anisotropy, density, porosity, gamma ray, seismic pressure wave, shear velocity values, or combinations thereof.

12. The method of claim 1, wherein the measured well log data are acquired from one or more borehole measurements.

13. The method of claim 1, wherein the measured well log data are obtained from an anisotropic logging tool.

14. The method of claim 1, wherein the posterior probability density functions comprise one or more conditional probability density functions for elasticity and resistivity anisotropic parameters given a vertical electrical resistivity and a horizontal electrical resistivity indicated in the measured well log data.

15. The method of claim 1, further comprising deriving one or more uncertainty anisotropic profile ranges from the well log data and the joint multi-dimensional probability density function; and using the uncertainty anisotropic profile ranges to generate the seismic image.

16. A method for processing seismic data, comprising:
performing a plurality of stochastic simulations for one or more rock model parameters to generate one or more anisotropic parameters for a subsurface area of the earth;
deriving one or more joint multi-dimensional probability density functions for the anisotropic parameters generated by the stochastic simulations;
deriving one or more joint multi-dimensional probability density functions for an elastic anisotropy of a rock matrix from the joint multi-dimensional probability density functions for anisotropic parameters;
conditioning a tomography operator based on the joint multi-dimensional probability density functions for the elastic anisotropy of the rock matrix;
performing tomography using the conditioned tomography operator to generate a tomographic image; and
displaying the tomographic image.

17. The method of claim 16, wherein the elastic anisotropy of a rock matrix comprise anisotropic parameters $\epsilon$ and $\delta$ and vertical velocity $V_v$.

18. The method of claim 16, further comprising defining a rock model having the one or more rock model parameters.

19. The method of claim 18, wherein the plurality of stochastic simulations are performed by sampling a prior probability for each rock model parameter range.

20. A method for processing seismic data, comprising:
defining a rock model having one or more rock model parameters;
estimating one or more rock model parameter ranges for the rock model parameters;
estimating one or more prior probabilities for the rock model parameter ranges;
performing a plurality of stochastic simulations for each rock model parameter range to generate one or more anisotropic parameters for a subsurface area of the earth;
deriving one or more joint multi-dimensional probability density functions for the anisotropic parameters generated by the stochastic simulations;
computing one or more posterior probability density functions from measured well log data and the joint multi-dimensional probability density functions;
deriving one or more anisotropic profiles from the posterior probability density functions;
generating a seismic image from the anisotropic profiles; and
displaying the seismic image.

* * * * *